Jan. 27, 1925.
O. HAYES
VAPORIZING MANIFOLD
Filed May 25, 1917
1,524,240
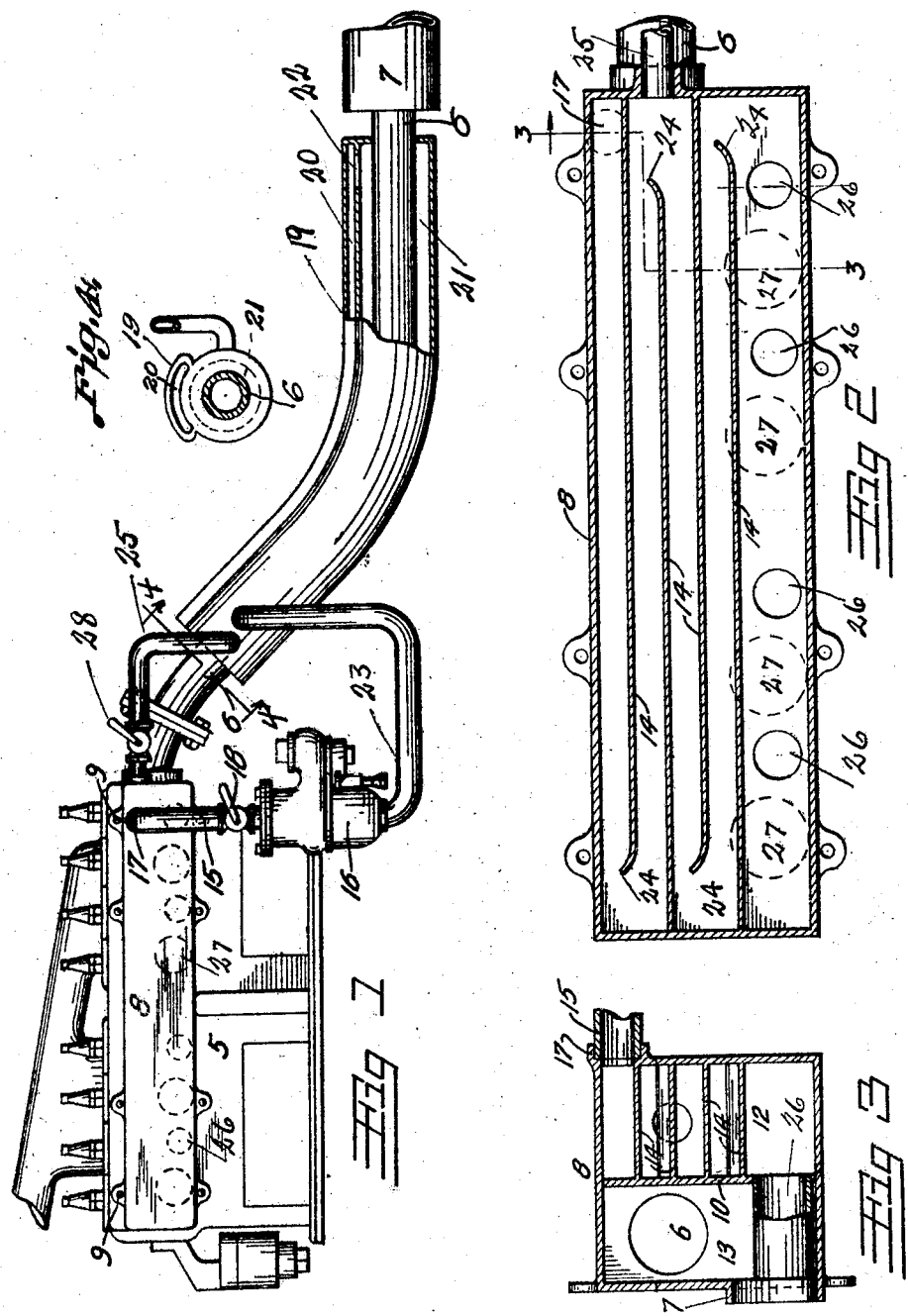
INVENTOR
Oscar Hayes
BY Jno. G. Powell
ATTORNEY.
WITNESS:
R. H. Galbreath Patented Jan. 27, 1925.

1,524,240

UNITED STATES PATENT OFFICE.

OSCAR HAYES, OF DENVER, COLORADO.

VAPORIZING MANIFOLD.

Application filed May 25, 1917. Serial No. 170,909.

*To all whom it may concern:*

Be it known that I, OSCAR HAYES, a citizen of the United States, and a resident of the city and county of Denver, and State of Colorado, have invented certain new and useful Improvements in Vaporizing Manifolds, of which the following is a full, clear, and exact description, such as will enable others skilled in the art to which the invention appertains to make and use the same.

The invention relates to means for vaporizing liquid hydrocarbon for use as the motive fluid in engines.

The object of the invention is to provide means, whereby hydrocarbon motive fluids, particularly kerosene or other oil may be vaporized under the influence of the heat of the engine for which it is used as a motive fluid.

Another object of the invention is to provide means whereby a maximum amount of heat from the engine is conserved and its influence directed on the hydrocarbon liquid.

Another object of the invention is to provide means for effecting a thorough mixture of oxygen with the gaseous motive fluid.

With these and other objects in view, the invention will now be described with reference to the accompanying drawing, forming a part hereof.

Fig. 1 is an elevation view of an engine with the improved manifold attached thereto; Fig. 2 is a longitudinal sectional view of the gasifying chamber; Fig. 3 is a cross sectional view, taken on the line 3—3 of Fig. 2 and Fig. 4 is a sectional view taken on the line 4—4 of Figure 1.

Corresponding and like parts are referred to in the following description and indicated in all the views of the accompanying drawing by the same reference characters.

Let the numeral 5 designate a gas engine of ordinary construction, the numeral 6 the exhaust pipe thereof leading to the muffler 7. The numeral 8 represents a vaporizing chamber that is secured to the engine 5, as shown at 9. The chamber 8 is provided with a longitudinal partition 10, which divides said chamber into an intake compartment 12 and an exhaust compartment 13. The intake compartment 12 is provided with a plurality of shelves 14 therein that extend longitudinally with said compartment, which form a circulating passage through said intake compartment. These shelves 14 are relatively shorter than the compartment 12, and one extremity of each shelf is alternately spaced away from the end of the said compartment to permit of a continuous passage for the motive fluid through said intake compartment 12. An induction pipe 15 leads from the carbureter 16 and communicates with the chamber 8 at 17, the pipe 15 being controlled by a plug 18, whereby the supply of motive fluid to the chamber 8 may be shut off, or regulated. A portion of the exhaust pipe 6 is surrounded by means of a jacket 19, said jacket 19 having a passage 20 therein for the induction of air. This passage 20 has its open extremity to the atmosphere remote from the muffler 7, whereby dust will not be drawn into said passage. The inner extremity of the passage 20 opens into a chamber 21, surrounding the exhaust pipe 6, through a port 22. An induction pipe 23 leads from the chamber 21 to the carburetter 16. The air is subjected to heat from the exhaust pipe 6 in passing through the chamber 21, and is conducted into the compartment 12 and into the carbureter 16 in a heated condition. This heated air is mixed with a supply of kerosene, or other oil in the carburetter 16, and as the mixture circulates through the compartment 12, the same is further subjected to the influence of heat from the engine 5. The spaced away extremity of each shelf 14 is upwardly curved, as shown at 24, whereby the mixture in traveling over these curved extremities of the shelves is caused to cyclone before taking a reverse course of travel, thereby more effectively mixing the gaseous motive fluid with the heated air. An air induction pipe 25 leads from the chamber 21 to the compartment 12, the said air induction pipe 25 communicating with the compartment 12 below the first shelf 14, and by means of which supplemental air may be admitted into the compartment 12 when ever desired for the purpose of supplying an additional quantity of oxygen to the mixture. The mixture, after having successively passed over the shelves 14, is finally discharged from the lower portion of the intake compartment 12, through induction tubes 26 into the cylinders of the engine 5. These tubes 26 pass through the exhaust compartment 13. Eduction ports 27 communicate with the exhaust compartment 13, and through which, the exhaust passes into the exhaust compartment 13. The exhaust pipe 6 communicates with this exhaust compartment 13, and conveys the exhaust to the muffler 7, the exhaust serving to heat the fuel mixture as it passes through the compartment 12. By reason of the shelves 14 in the compartment 12, the mixture is caused to travel a relatively long distance in a minimum space, thereby giving the mixture ample time to be raised to the proper temperature before being taken into the combustion chambers of the engine. The pipe 25 is controlled by means of a valve 28, the valve 28 being adjustable to regulate the supply of supplemental air, or to entirely shut the same off.

The use and operation of the invention has been fully followed out in the foregoing description and in conjunction with the description of the structural elements of the invention, and further recitation of the mode of operation is believed unnecessary.

While I have described and illustrated herein a specific form of my invention, it is understood that I am not limited thereto and that the same may be modified and varied without departing from the spirit of the invention, or the scope of the appended claim.

Having thus described my invention, what I claim and desire to secure by Letters Patent is:

The combination with an explosive engine and a carbureter therefor, of a vaporizing manifold longitudinally divided from end to end thereof to provide two chambers comprising intake and exhaust compartments, a fuel inlet leading into the intake compartment through one side and at the upper corner thereof from the carbureter, a plurality of fuel outlets leading from the lower portion of the intake compartment and extending through the division wall along the lower wall of the exhaust compartment and through the opposite side wall of the manifold to the inlets of the explosive engine, a series of shelves each having their end portion upwardly curved arranged between the inlet and outlets of the intake compartment and alternately terminating short of the opposite end wall of the intake compartment to thoroughly intermix the gaseous charge passing therethrough, exhaust passages from the engine connected to the exhaust compartment of the manifold, and an outlet from said exhaust compartment.

In testimony whereof, I affix my signature.

OSCAR HAYES.